No. 710,803. Patented Oct. 7, 1902.
F. O. RICHMOND.
DEVICE FOR EXTRACTING TENDONS FROM THE LEGS OF FOWLS.
(Application filed Dec. 9, 1901.)
(No Model.)

Witnesses
Edward L. Day
Fred O. Fish

Inventor
Frederick O. Richmond
by his Attorney
Benjamin Philips

THE NORRIS PETERS CO., PHOTO-LITHO., WASHINGTON, D. C.

UNITED STATES PATENT OFFICE.

FREDERICK O. RICHMOND, OF LYNN, MASSACHUSETTS.

DEVICE FOR EXTRACTING TENDONS FROM THE LEGS OF FOWLS.

SPECIFICATION forming part of Letters Patent No. 710,803, dated October 7, 1902.

Application filed December 9, 1901. Serial No. 85,163. (No model.)

*To all whom it may concern:*

Be it known that I, FREDERICK O. RICHMOND, a citizen of the United States, residing at Lynn, in the county of Essex and State of Massachusetts, have invented certain new and useful Improvements in Devices for Extracting Tendons from the Legs of Fowls; and I do hereby declare the following to be a full, clear, and exact description of the invention, such as will enable others skilled in the art to which it appertains to make and use the same.

The present invention relates to a device for extracting tendons from the leg of a fowl, and has for its object to provide a simple and efficient device by means of which the tendons can be easily and quickly extracted.

To this end my invention consists in the device hereinafter described and claimed.

A device embodying my invention comprises two members arranged to receive between them the portion of the leg above the claw and to hold this portion of the leg while the remaining portion, together with the body of the fowl, is forcibly pulled away therefrom. These members are so shaped that the leg of the fowl which has been inserted between them may be bent over one of them to break the bone of the leg if the bone has not been previously broken. To facilitate breaking the bone, the members between which the leg is received are preferably provided with beveled edges, and the upper outer surfaces of the arms are also slightly beveled, so that a ridge is formed on the upper surface of each arm.

In its preferred form the device comprises a base adapted to be secured to some fixed support and two upwardly-curving arms extended therefrom, the upward curve of the arms serving to prevent the leg from slipping over the end of the arm over which the leg is bent during the operation of extracting the tendons.

The preferred form of the device is illustrated in the accompanying drawings, in which—

Figure 1:
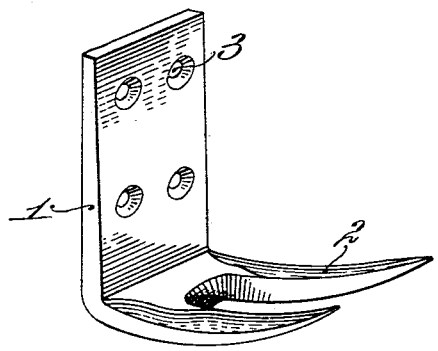
Figure 2:
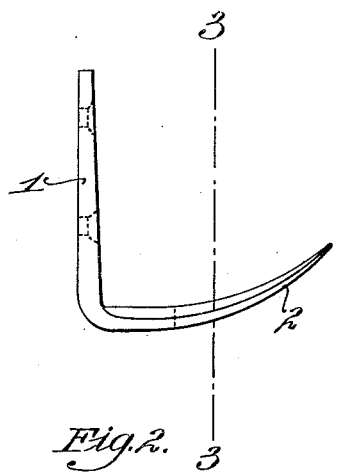

Figure 1 is a perspective view thereof. Fig. 2 is a view in side elevation; and Fig. 3 is a front elevation, partly in section, on the line 3 3 of Fig. 2, said figure also illustrating in dotted lines a fowl from whose leg the tendons are being extracted.

As shown, the device is formed of a single piece of metal and comprises a base 1 and two upwardly-curving arms 2, extended from the lower portion of the base. A series of holes 3 is formed in the base 1, through which the screws pass, which secure the device at the desired height to a suitable support. The inner edges of the arms 2 diverge slightly and are arranged at such a distance apart as to receive between them the portion of the leg of a fowl above the claw. The inner edges of the arms are beveled, as shown, as are also the upper surfaces of the arms.

Figure 3:
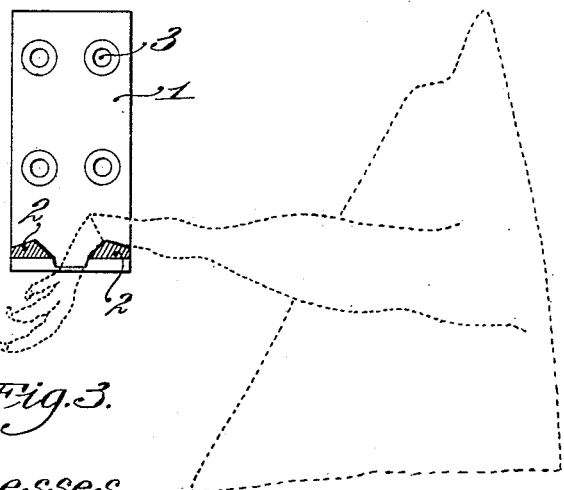

In using the device the leg of a fowl is inserted between the arms with the claw down, as shown in Fig. 3, and the leg is bent over one of the arms and the bone broken by contact with the beveled edge and the ridge on the upper surface of the arm. After the bone is broken that portion of the leg above the break is forcibly pulled upon until the tendons attached to the portion held by the arms are drawn out.

Having thus described my invention, I claim as new and desire to secure by Letters Patent of the United States—

1. A device for extracting tendons from the leg of a fowl, comprising a base, members extended therefrom between which the leg of the fowl is received and held, and over one of which the leg is bent, said members being provided with bone-breaking ridges, substantially as described.

2. A device for extracting tendons from the leg of a fowl, comprising a base, two upwardly-curving arms extended therefrom between which the leg of the fowl is received and held, and over one of which the leg is bent, said arms being provided upon their upper surfaces with bone-breaking ridges, substantially as described.

In testimony whereof I affix my signature in presence of two witnesses.

FREDERICK O. RICHMOND.

Witnesses:
 FRED O. FISH,
 ALFRED H. HILDRETH.